United States Patent [19]
Mao

[11] Patent Number: 6,032,780
[45] Date of Patent: Mar. 7, 2000

[54] TRANSIT STORAGE DEVICE FOR CONNECTION ROLLING AND HYDRAULIC PLASTIC/WALL TILE PRODUCTION DEVICE

[76] Inventor: Chen-Chi Mao, 7th Floor, No. 20, Pa Te Road, Section 3, Taipei, Taiwan

[21] Appl. No.: 09/008,332

[22] Filed: Jan. 16, 1998

[30] Foreign Application Priority Data

May 7, 1997 [TW] Taiwan ................................ 86207313

[51] Int. Cl.⁷ ..................................................... B65G 1/00
[52] U.S. Cl. ....................................................... 198/347.1
[58] Field of Search ............................ 198/347.1, 347.2; 226/33, 38, 122, 195

[56] References Cited

U.S. PATENT DOCUMENTS

| | | | |
|---|---|---|---|
| 3,998,319 | 12/1976 | Mernøe | 198/347.1 |
| 4,011,975 | 3/1977 | Brown, Jr. | 226/33 |
| 5,314,054 | 5/1994 | Van Laar | 198/347.1 |
| 5,611,418 | 3/1997 | Helmstetter | 198/347.1 |

*Primary Examiner*—James R. Bidwell
*Attorney, Agent, or Firm*—Birch, Stewart, Kolasch & Birch, LLP

[57] ABSTRACT

The present invention relates to a transit storage device for connecting rolling and hydraulic plastic/wall tile production devices. A receiving belt set is connected by a storage belt set to a delivery belt set. The receiving belt set and delivery belt set are in a tension state on the upper and lower conveyor belt sides. The upper side of the conveyor belt for the storage belt set initially has some tension but the conveyor belt on the lower side is not in tension and hangs down in a U-shape. The belt set is connected to the rear end of the rolling delivery set of plastic floor/wall tiles, and the delivery belt set is mounted on the front end of a hydraulic plastic floor/wall tiles knurling device. When the hydraulic device is carrying on knurling, material delivery to the device stops. Material can continue to be delivered by rolling delivery for transit storage of material on the storage belt set so that delivery and hydraulic action can be synchronously matched.

10 Claims, 3 Drawing Sheets

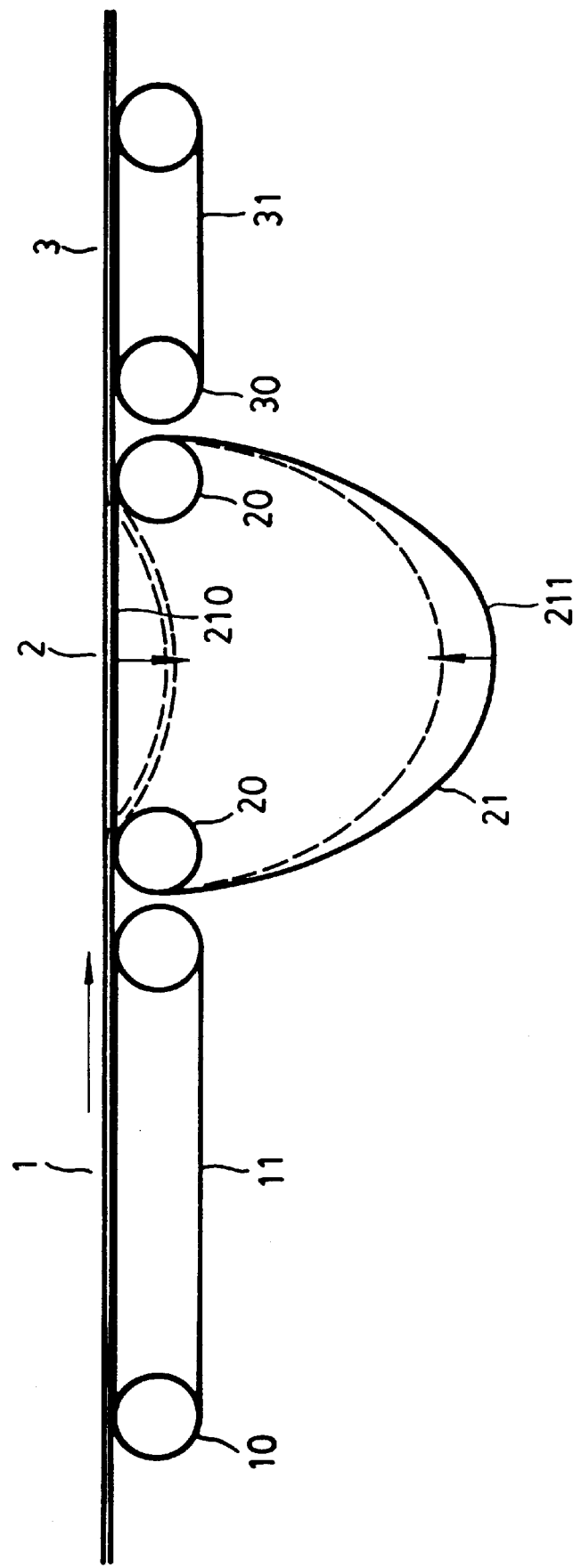

TRANSIT STORAGE DEVICE FOR CONNECTION ROLLING AND HYDRAULIC PLASTIC/WALL TILE PRODUCTION DEVICE

BACKGROUND OF THE INVENTION

This invention relates to a transit storage device for connecting rolling and hydraulic plastic/wall tile production device. The transit storage device can connect rolling and hydraulic production devices of the same process into one consistent production device so as to make excellent products by making use of the advantage of the two devices.

DESCRIPTION OF THE BACKGROUND ART

Plastic material has such features as plasticization, lightweight and flexibility and water resistance. etc. Thus, such material may be used for producing floor/wall tiles which have become a new attractive item for decorations in the construction industry. With excellent plasticization of plastic which match the promotion of pattern align technique enables the shaping of plastic floor/wall tiles to be as good as that of ceramic floor/wall tiles.

Unlike the ceramic floor/wall tiles which are made by means of kiln combustion, the production of plastic floor/wall tiles mostly adopts rolling or hydraulic type techniques. The rolling type relates to one complete set of production from extrusion. stick-up, knurling to formation, with feature of one consistent process; however the surface of the product can not be made with deeper knurl due to the restriction of knurling wall so that it can only display much flat knurl. This affects the ability of plastic floor/wall tiles to display the elevational surface effect. The plastic floor/wall tiles produced by hydraulic production have the advantage of knurling by hydraulic press which makes the knurling of plastic floor/wall tiles resembling the deep pattern of ceramic floor/wall tiles to give positive help of them in place of ceramic floor/wall tiles: however, hydraulic production of plastic floor/wall tiles needs to roll the material into a roll and to cut it into a blank of large area subject to the size of hydraulic formation for sending it into the press by means of a lap for knurling and trimming. Thus, in hydraulic production of plastic floor/wall tiles, the process is not consistent and each process cost a large amount of time (especially for knurling stage). For whole lap knurling, in order to save knurling time, plural sets of press molds are prepared which increase the cost. Therefore, hydraulic production can not compete with rolling production with regard to the productivity and price.

The two types of production for plastic floor/wall tiles have their own advantage and defect, and the advantage and defect are to compensate each other, i.e. consistent and fast process of rolling production gives the advantage to make up for the defect of hydraulic process interruption and slow production speed. Deeper elevational knurling as made by means of hydraulic production can make up for inadequate depth of pattern as made by the rolling production. Based on the mutual make-up relationship, if the advantage of both types could be integrated, it shall give good benefit to the promotion of manufacturing technology and product quality of the existing floor/wall tiles; however, why has such integral technology has not been generated? The key point lies in the conflict between the rolling and hydraulic types.

Most plastic floor/wall tile manufacturers all know that, one consistent process by using a series of roller sets from plastic material extrusion, stick-up to rolling formation is most suitable for planning into the automation mode. This is because such production method has a consistent rate from downfeed to finished products without interruption problem, on the contrary, hydraulic production must roll the raw material into slate type and then gather them up in roll manner. The rolling material is then cut into piece by piece at proper size and heated up to appropriate state for knurling, and the whole lap is sent into a hydraulic machine for knurling. According to the above-said hydraulic production process, extrusion and knurling can not be synchronized in operation. The action of extrusion is consistent and does not allow the process to be stopped, or extruded thermal-melt material will be pushed and leaked all over the floor: however, knurling must be suspended for a short period to make pattern clear formation. Therefore, hydraulic production can not be developed into consistent and full-automatic production mode from downfeed to finished products.

SUMMARY OF THE INVENTION

According to the above-said analysis, rolling is a continuous process and hydraulic is an intermittent process. If the two types of process were integrated, the feature of rolling continuous extrusion stick-up and the advantage of deeper knurling by hydraulic production may make better products. A transfer device should be used for rolling, continuous delivery of material, and upon the termination of delivery during hydraulic action, material continuously delivered should be stored in transit till the restoration of material delivery by hydraulic machine, and the material in the transit device shall be delivered. Therefore, when material is continuously delivered, synchronized and intermittent hydraulic knurling can be conducted and it may effectively connect the rolling and hydraulic process device, by using a delivery transit device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitive of the present invention, and wherein:

FIG. 3 is an operating diagram of this invention.

DETAILED DESCRIPTION OF PREFERRED EMBODIMENT

Figure 1:
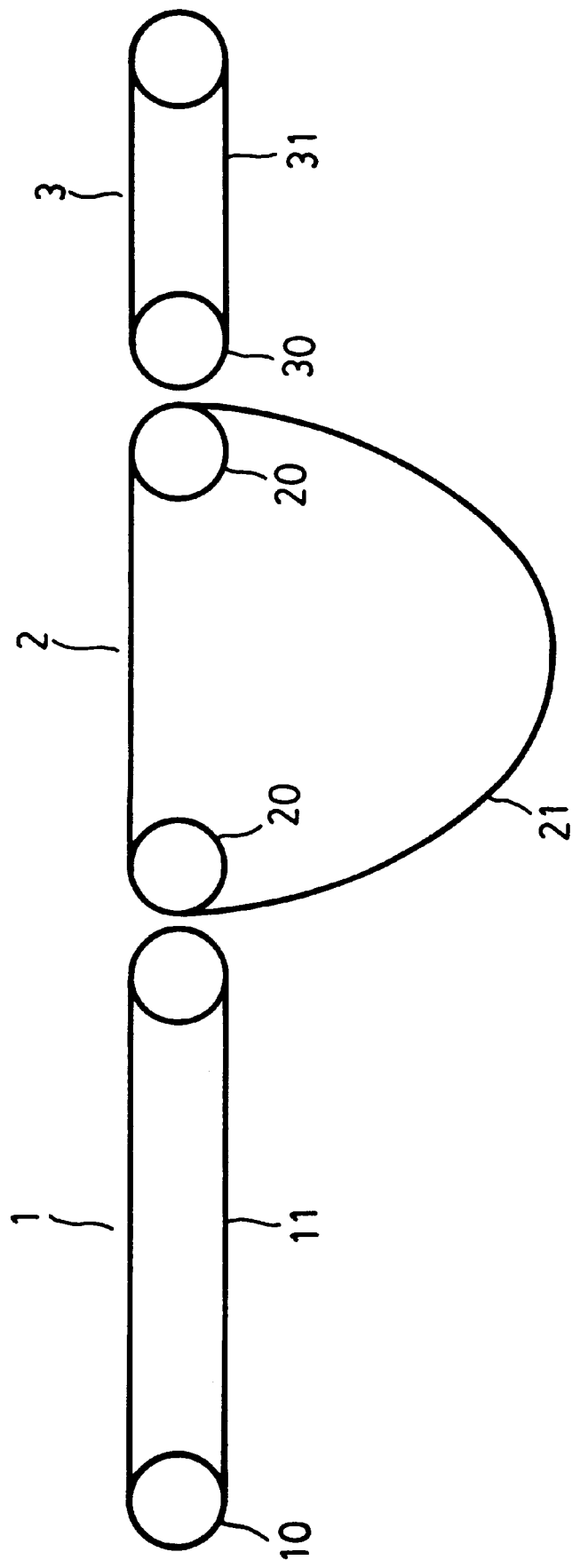
FIG. 1 is a structural diagram of this invention.

Referring to FIG. 1, this invention comprises a connection belt set 1, storage belt set 2, delivery belt set 3. The connection belt set 1 and delivery belt set 3 are joined together by means of conveyor belts 11 and 31 between the front and rear rollers 10, 30. The conveyor belts 11, 31 are in tension between the rollers 10, 30. The storage belt set is also includes rollers 20 and conveyor belt 21, but the conveyor belt 21 between the two rollers 20 is shown hanging-down in a U shape on the lower end while upper end at tension state.

Figure 2:
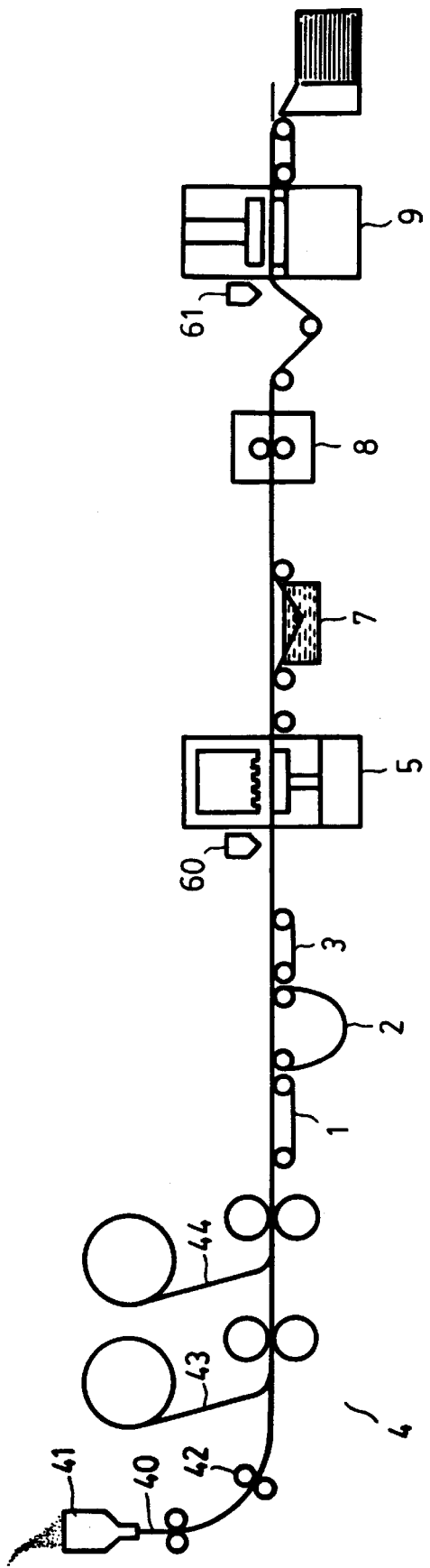
FIG. 2 is a combination diagram of this invention with rolling device and hydraulic device.

Referring to FIG. 2, the present invention is mounted on the rear end of rolling delivery device 4 and the front end of hydraulic device 5. A thermal-melt base material 40 for making the plastic floor/wall tiles is extruded from the extruder 4 and rolled into slate type through the roller 42 and then being sticked up with the middle skin 43, printing skin 44, and then is delivered into the receiving belt set 1, storage belt set 2 and delivery belt set 3. The material delivered from the delivery belt set 3 is conducted through a sensor 60 control for knurling, and then the precision pattern is pressed out with hydraulic device 5 on the rear section. Upon the completion of knurling, the material is delivered into the water tank for cooling, and then into the trimmer 8 for trimming off burr. Another sensor 61 control. The floor/wall tiles are cut by the press 9 into appropriate size, and then are inspected and packaged. The above-said rolling delivery device 4 may also only have the extruder 41 without middle skin 43, printing skin 44 and stick-up mechanism 44.

Referring to FIG. 3 and FIG. 2, when the present hydraulic device 5 has not carried out knurling, as material delivery is not stopped, material therefore will pass by the the conveyor belt on the upper end of the storage belt set 2 without imposing any pressure from material itself, and the conveyor belt 210 on the upper end of storage belt set 2 will be keep horizontal. When the hydraulic device 5 is carrying out knurling, the material delivery will be stopped on the delivery belt set 3 due to knurling, but rolling delivery device 4 cannot stop and material will be delivered into the receiving belt set 1 but blocked on the delivery belt set 3 which could cause a material movement problem. At that moment, the conveyor belt 210 on the upper end of the storage belt set 2 will be forced to hang down between the two rollers 20 due to the pressure of material weight to cause the conveyor belt 211 on the lower end to shrink upwardly. This shrinking upwardly of storage belt set 2 on the conveyor belt on the upper and lower ends of storage belt set 2 will continue until hydraulic device 5 stops knurling and material delivery is again smooth. The material on the conveyor belt 210 will be delivered into the hydraulic device 5, and upon decrease of material weight, the conveyor belt on the upper and lower ends of storage belt set 2 will restore to its original state. The present invention can give transit storage for material that cannot be delivered forward through lower hanging-down and upper shrinking of conveyor belt on the upper and lower ends of storage belt set 2. Thus, the rolling delivery device 4 on the front section of the present invention will not be required to stop the delivery due to the operation of hydraulic device 5, and hydraulic device 5 will not have the trouble of stopping knurling due to continuous delivery of rolling delivery device 4.

Referring to FIGS. 2 and 3, though the receiving belt set 1 and delivery belt set 3 of the present invention are not the major part for transit storage of material, they are the essential ones to the completion of material transit storage function. For receiving belt set 1, its conveyor belt set 11 at face state is loading the hot and soft material to prevent material dropping into the storage belt set 2 directly from rolling delivery set 4 and to avoid the risk of material interruption on the roller 20. The delivery belt set 3 loads the slightly cooling-down material previously held on the storage belt set 2, and the material may be little heated for delivering into the hydraulic device 5 for carrying out knurling to obtain a clear pattern. The delivery belt set 3 may allow the material which has entered the hydraulic device 5 not to impose direct action of its pulling force against the other roller 20 of storage belt set 2 to avoid the roller 20 being damaged by the material. Therefore, the receiving belt set 1 and delivery belt set 3 have the above-said auxiliary function.

The present invention seems to be a simple structure but may effectively integrate rolling and hydraulic processes of the same production line. The effect of such integration may resolve the problem of failing to make deeper pattern of rolling process and the defect of hydraulic process not being consistent so as to promote the quality of plastic floor/wall tiles to resemble ceramic floor/wall tiles. The present invention may also solve hydraulic process which has consumed excessive energy as a result of pressing pattern by further heating material and cost increase as result of making molds for the whole-batch knurling. The present invention provides a fixed-speed and positioning full-automatic process by using one mold for knurling piece by piece without excessive heating.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transit storage device for connecting rolling and hydraulic plastic/wall tile production devices, the transit storage device comprising:

a receiving belt set having a conveyor belt with an upper surface and a lower surface, both the upper and lower surfaces of the receiving conveyor belt being generally in tension, the receiving belt set being connected to a rear end of a rolling delivery set of plastic floor/wall tiles;

a delivery belt set having a conveyor belt with an upper surface and a lower surface, both the upper and lower surfaces of the delivery conveyor belt being generally in tension, the delivery belt set being connected on a front end of a hydraulic plastic floor/wall tiles knurling device;

a storage belt set connecting the receiving belt set and the delivery belt set, the storage belt set having a conveyor belt with an upper surface and a lower surface, the upper surface of the storage conveyor belt initially being in tension and the lower surface thereof initially hanging down.

2. The transit storage device according to claim 1, wherein the rolling delivery set of plastic floor/wall tiles to which the receiving belt set is connected includes at least one of an extruder, a device for providing a middle skin and a device for providing a printing skin.

3. The transit storage device according to claim 2, wherein the rolling delivery set of plastic floor/wall tiles includes each of the extruder, the device for providing a middle skin and the device for providing a printing skin.

4. The transit storage device according to claim 1, wherein the rolling delivery set of plastic floor/wall tiles to which the receiving belt set is connected includes at least one of an extruder, a device for providing a middle skin and a device for providing a printing skin.

5. The transit storage device according to claim 4, wherein the rolling delivery set of plastic floor/wall tiles includes each of the extruder, the device for providing a middle skin and the device for providing a printing skin.

6. The transit storage device according to claim 1, wherein the upper surface of the storage conveyor belt receives material from the receiving conveyor belt even when the delivery conveyor belt stops receiving material from the storage conveyor belt.

7. The transit storage device according to claim 6, wherein the upper surface of the storage conveyor belt can sag under weight of material stored therein.

8. The transit storage device according to claim 1, wherein the storage conveyor belt extends between at least two rollers and wherein the upper surface of the storage conveyor belt can bow between the two rollers to accommodate storage of material thereon.

9. The transit storage device according to claim 1, wherein the upper surface of the storage conveyor belt is initially flat and wherein the upper surface of the storage conveyor belt can assume a curved shape during operation of the transit storage device.

10. The transit storage device according to claim 9, wherein the upper surface of the storage conveyor belt assumes a curved shape when material is stored thereon.

* * * * *